United States Patent
Umemoto et al.

(10) Patent No.: US 7,883,771 B2
(45) Date of Patent: Feb. 8, 2011

(54) HALOGEN-FREE PRESSURE-SENSITIVE ADHESIVE TAPE

(75) Inventors: Hiroshi Umemoto, Susono (JP); Masato Koike, Susono (JP); Susumu Hara, Susono (JP); Hiroshi Ichikawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/720,947

(22) PCT Filed: Dec. 9, 2005

(86) PCT No.: PCT/JP2005/022679

§ 371 (c)(1),
(2), (4) Date: Jun. 24, 2009

(87) PCT Pub. No.: WO2006/062196

PCT Pub. Date: Jun. 15, 2006

(65) Prior Publication Data

US 2010/0009181 A1  Jan. 14, 2010

(30) Foreign Application Priority Data

Dec. 10, 2004 (JP) .............................. 2004-358774

(51) Int. Cl.
*B32B 7/12* (2006.01)
*B60C 1/00* (2006.01)
*C08L 1/00* (2006.01)
*C08L 33/06* (2006.01)

(52) U.S. Cl. ............................. 428/355 AC; 428/343; 524/526; 524/560

(58) Field of Classification Search ................ 428/343, 428/355; 524/526, 560
See application file for complete search history.

(56) References Cited

U.S. PATENT DOCUMENTS

| 5,130,375 A | * | 7/1992 | Bernard et al. | ............... 525/278 |
| 6,274,657 B1 | * | 8/2001 | Geoghegan et al. | ......... 524/270 |
| 2005/0101720 A1 | * | 5/2005 | Fukumoto et al. | ........... 524/504 |

FOREIGN PATENT DOCUMENTS

| JP | 54-3136 | 1/1979 |
| JP | 8-27450 A | 1/1996 |
| JP | 11-256122 A | 9/1999 |
| JP | 2000-327708 A | 11/2000 |
| JP | 2003128714 A | 5/2003 |
| JP | 2003-219533 A | 7/2003 |
| JP | 2003-178628 A | 5/2007 |
| WO | 97/05206 | 2/1997 |

OTHER PUBLICATIONS

Machine translation of JP2000-327708 (2000).*
Derwent abstract of JP2000-327708 (2000).*
Taiwanese Office Action dated Dec. 30, 2009.
Official Communication issued on May 20, 2010 in counterpart German Application No. 11 2005 003 023.7.
Japanese Office Action Report, Application No. 2004-358774, Jun. 25, 2010,7 pages.
Chinese Office Action for Application No. 200580042238, dated Apr. 8, 2010.
"Dictionary of Chemistry and Chemical Engineering" pp. 2812, Jan. 2003.

* cited by examiner

*Primary Examiner*—Callie E Shosho
*Assistant Examiner*—Samir Shah
(74) *Attorney, Agent, or Firm*—Sughrue Mion, PLLC

(57) ABSTRACT

A halogen-free pressure-sensitive adhesive tape including a tape substrate made of a non-halogen resin composition containing no halogen elements and, applied to at least one side of the substrate, a pressure-sensitive adhesive containing a modified acrylic resin obtained by copolymerizing acrylic acid or an acrylic ester with a monomer which forms a tackifier resin.

3 Claims, No Drawings

HALOGEN-FREE PRESSURE-SENSITIVE ADHESIVE TAPE

TECHNICAL FIELD

The present invention relates to a halogen-free pressure-sensitive adhesive tape obtained by applying a pressure-sensitive adhesive to a tape substrate made of a non-halogen resin composition containing no halogen elements.

BACKGROUND ART

With the recent trend toward performance elevation and function advancement in motor vehicles, electrified products, etc., such products have come to be provided with many electric wires and wire harnesses are frequently used in wiring. These wire harnesses are systems produced by processing electric wires beforehand so as to have necessary forms, specifically, subjecting wires to branching, connector attachment to ends, etc., and binding the processed electric wires by winding a pressure-sensitive adhesive tape therearound.

The pressure-sensitive adhesive tapes heretofore in general use are PVC-based pressure-sensitive adhesive tapes obtained by applying a pressure-sensitive adhesive to a substrate made of a vinyl chloride resin composition. However, there is a problem that these pressure-sensitive adhesive tapes generate a halogen gas or halogen compound gas upon incineration disposal, etc. to cause environmental pollution. The conventional pressure-sensitive adhesive tapes are hence being replaced by halogen-free pressure-sensitive adhesive tapes employing as the substrate a non-halogen resin composition containing no halogen elements (see, for example, patent document 1 and patent document 2).

[Patent Document 1] JP-A-2003-178628
[Patent Document 2] JP-A-2003-219533

DISCLOSURE OF THE INVENTION

Problem that the Invention is to Solve

Such halogen-free pressure-sensitive adhesive tapes employ a pressure-sensitive adhesive which, like the pressure-sensitive adhesive of PVC-based pressure-sensitive adhesive tapes, is formed by using natural rubber, an acrylic resin, and a tackifier resin as major ingredients and adding thereto additives such as an antioxidant, plasticizer, filler, aging inhibitor, and copper inhibitor. However, the adhesion of the pressure-sensitive adhesive to the substrate in the halogen-free pressure-sensitive adhesive tapes heretofore in use is lower than the adhesion of the pressure-sensitive adhesive to the substrate in PVC-based tapes. The halogen-free adhesive tapes hence have a problem that in wire harness production, the tape which has been wound around electric wires get loose to suffer wrinkles or tape end peeling, resulting in an impaired finish or appearance. Although attempts are being made to improve adhesion by, e.g., regulating the proportions of the components, the improvement at present is not sufficient.

The invention has been achieved under these circumstances. An object of the invention is to heighten the adhesion of a halogen-free pressure-sensitive adhesive tape, in particular, the adhesion of the pressure-sensitive adhesive to the substrate, to thereby improve suitability for binding.

Means for Solving the Problem

In order to overcome the problem described above, the invention provides the following halogen-free pressure-sensitive adhesive tapes.

(1) A halogen-free pressure-sensitive adhesive tape which comprises a tape substrate made of a non-halogen resin composition containing no halogen elements and, applied to at least one side of the substrate, a pressure-sensitive adhesive containing a modified acrylic resin obtained by copolymerizing acrylic acid or an acrylic ester with a monomer which forms a tackifier resin.

(2) The halogen-free pressure-sensitive adhesive tape according to the above (1), wherein in the modified acrylic resin, the amount of the monomer which forms a tackifier resin is 4-8 parts by weight per 100 parts by weight of the acrylic acid or acrylic ester.

(3) The halogen-free pressure-sensitive adhesive tape according to the above (1) or (2), wherein the pressure-sensitive adhesive contains at least one of acrylic resins and tackifier resins.

(4) The halogen-free pressure-sensitive adhesive tape according to any one of the above (1) to (3), which is for use in wire harness binding.

ADVANTAGE OF THE INVENTION

In the halogen-free pressure-sensitive adhesive tape of the invention, the pressure-sensitive adhesive has enhanced adhesion to the substrate because the pressure-sensitive adhesive contains a modified acrylic resin. Consequently, when this pressure-sensitive adhesive tape is used, for example, in wire harness binding, a wire harness having an excellent finish or appearance is obtained.

BEST MODE FOR CARRYING OUT THE INVENTION

The invention will be explained below in detail.

The substrate of the halogen-free pressure-sensitive adhesive tape of the invention is made of an olefin resin composition. Preferred examples thereof include a non-halogen flame-retardant olefin resin obtained by adding a flame retardant comprising a metal hydroxide such as magnesium hydroxide or aluminum hydroxide, an antioxidant such as a phenol compound or an amine compound, a copper inhibitor such as a triazine derivative, etc. into a base resin comprising polypropylene, polyethylene, a propylene/ethylene copolymer, or the like. However, the resin composition should not be construed as being limited to these examples. The thickness of the substrate may be the same as in general pressure-sensitive adhesive tapes, and is generally 5-500 μm.

A pressure-sensitive adhesive is applied to the substrate. The pressure-sensitive adhesive contains as an essential ingredient a modified acrylic resin obtained by copolymerizing acrylic acid or an acrylic ester with a monomer which forms a tackifier resin. Acrylic acid or the acrylic ester is a monomer which forms an acrylic resin. This acrylic resin by itself is in extensive use as the main component of pressure-sensitive adhesives.

On the other hand, the tackifier resin by itself also is in extensive use as the main component of pressure-sensitive adhesives. In the invention, by incorporating a modified acrylic resin comprising both, adhesion can be greatly improved as compared with the case where the acrylic resin and the tackifier resin are incorporated as separate resins.

The acrylic resin and acrylic ester to be used are not limited as long as they are monomers forming acrylic resins which are used in pressure-sensitive adhesives. Examples of the acrylic ester include butyl acrylate, 2-ethylhexyl acrylate, 2-hydroxyethyl acrylate, 2-hydroxypropyl acrylate, tetrafurfuryl acrylate, and isononyl acrylate. 2-Ethylhexyl acrylate is preferred of these because it is highly effective in improving the adhesion of the pressure-sensitive adhesive to the substrate.

In general, terpene resins, hydrogenated aromatic resins, hydrogenated aliphatic resins, coumarone-indene resins, phenolic resins, styrene resins, and the like are used as tackifier resins. In the invention, however, a monomer copolymerizable with acrylic acid or the acrylic ester is suitably selected from monomers which form these tackifier resins and is used. Preferred of such monomers are monomers forming terpene resins because these monomers give a modified acrylic resin having the higher ability to impart adhesion. Specifically, (β-pinene), dipentene, (α-pinene), α-pinene-phenol, dipentene-phenol, terpene-phenol, and the like are preferred. Terpene-phenol is especially preferred.

The amount of the monomer for a tackifier resin in the modified acrylic resin is preferably 4-8 parts by weight per 100 parts by weight of the acrylic acid or acrylic ester. In case where the amount of the monomer for a tackifier resin is smaller than 4 parts by weight, sufficient adhesion is not obtained and the resultant tape is apt to get loose or suffer end peeling. On the other hand, in case where the amount of the monomer for a tackifier resin exceeds 8 parts by weight, adhesion becomes too high and this results in excessive resistance in tape stripping, which in turn results in substrate elongation and blushing and thus leads to an impaired appearance of the wire harness.

Such a modified acrylic resin is available also on the market. For example, "SC-2 (2-ethylhexyl acrylate/terpene-phenol copolymer)", manufactured by Mushashino Chemical Ltd., can be used.

One or more monomers which are usually copolymerized with acrylic acid or the acrylic ester in forming acrylic resins may be present in the modified acrylic resin. Examples of such monomers include vinyl acetate, acrylonitrile, acrylamide, styrene, methacrylic acid, methyl methacrylate, ethyl methacrylate, propyl methacrylate, n-butyl methacrylate, isopropyl methacrylate, hydroxyethyl methacrylate, hydroxypropyl methacrylate, dimethylaminoethyl methacrylate, glycidyl methacrylate, maleic anhydride, itaconic acid, 1,3-butanediol diacrylate, 1,4-butanediol diacrylate, 1,6-hexanediol diacrylate, diethylene glycol diacrylate, neopentyl glycol diacrylate, and polyethylene glycol diacrylate.

In the invention, compounding ingredients other than the modified acrylic resin in the pressure-sensitive adhesive are not limited. In general, a pressure-sensitive adhesive is formed by using natural rubber, an acrylic resin, and a tackifier resin as adhesive ingredients and incorporating therein various additives such as, e.g., an antioxidant and a plasticizer. In the invention also, these ingredients can be incorporated. It is, however, noted that the modified acrylic resin combines the function of an acrylic resin and the function of a tacky resin and it is most preferred to wholly replace the acrylic resin in a pressure-sensitive adhesive heretofore in use by this modified acrylic resin. However, it is also possible to replace part of the acrylic resin by the modified acrylic resin. For the same reason, the tackifier resin in a pressure-sensitive adhesive heretofore in use may be wholly or partly replaced by the modified acrylic resin. Namely, the pressure-sensitive adhesive may contain all of an acrylic resin, the modified acrylic resin, and a tackifier resin as adhesive ingredients, or may contain two adhesive ingredients which are the modified acrylic resin and a tackifier resin or are an acrylic resin and the modified acrylic resin. In such cases, the proportions of these ingredients are suitably selected so that the proportions of the acrylic resin and tackifier resin are within the respective ranges heretofore in use according to the combination of the acrylic resin, modified acrylic resin, and tackifier resin.

Other ingredients preferably contained in the pressure-sensitive adhesive are natural rubber, a plasticizer, and an antioxidant. These ingredients each may be a known one. Preferred examples thereof are shown below. The amounts of these also may be suitably selected.

A plasticizer is added in order to impart moderate flexibility to the pressure-sensitive adhesive layer. It is preferred to use a plasticizer having a molecular weight of 450-3,000 in order to inhibit migration to the adherend while maintaining flexibility. Plasticizers having a molecular weight lower than 450 are apt to migrate, while plasticizers having a molecular weight exceeding 3,000 are poor in the effect of softening the pressure-sensitive adhesive at low temperatures and thereby reduce suitability for binding.

Furthermore, when adhesion at low temperatures is taken into account, one having a solidifying point of from −30° C. to −55° C. is preferred. In case where a plasticizer having a solidifying point lower than −55° C. is used, low-temperature adhesion is low and the tape is apt to get loose in tape winding operations. On the other hand, in case where a plasticizer having a solidifying point higher than −30° C. is used, low-temperature adhesion is too high and the tape is apt to zip upon stripping.

The kind of the plasticizer is not limited as long as it has the specific molecular weight and solidifying point shown above. However, polyester, trimellitic acid compound, and phthalic acid compound plasticizers are preferred. Specifically, examples of the polyester plasticizers include an adipic acid polyester (molecular weight, 800; solidifying point, −45° C.) and a polyester glutarate (molecular weight, 2,500; solidifying point, −40° C.), and examples of the trimellitic acid compound plasticizers include triisodecyl trimellitate (molecular weight, 630; solidifying point, −40° C.) and triisooctyl trimellitate (molecular weight, 550; solidifying point, −45° C.). Such plasticizers are available also on the market. For examples, plasticizer emulsion "KE-799 (molecular weight, 550; solidifying point, −50° C.)", manufactured by Arakawa Chemical Ltd., can be used.

Examples of the antioxidant include phenol compounds (hindered phenols) such as 2,6-di-t-butyl-p-cresol (BHT), 2,2'-methylenebis(4-methyl-6-t-butylphenol), triethylene glycol bis[3-(3-t-butyl-5-methyl-4-hydroxyphenyl)propionate] and pentaerythrityl tetrakis[3-(3,5-di-t-butyl-4-hydroxyphenyl)propionate], sulfur compounds such as dilauryl 3,3'-thiodipropionate (DLTDP) and distearyl 3,3'-thiodipropionate (DSTDP), phosphorus compounds such as triphenyl phosphite (TPP), triisodecyl phosphite (TDP), tri(2,4-di-t-butylphenyl) phosphite, and 2,2-methylenebis(4,6-di-t-butylphenyl) octyl phosphate, and amine compounds (hindered aromatic amines) such as octyldiphenylamine, N-n-butyl-p-aminophenol, and N,N-diisopropyl-p-phenylenediamine. These may be used alone or in suitable combination of two or more thereof.

It is also preferred to use another tackifier resin. Examples thereof include rosin resins such as rosin, rosin gum, tall oil rosin, hydrogenated rosin, and maleic-modified rosin, aliphatic, alicyclic, and aromatic petroleum resins, coumarone-indene resins, styrene resins, phenolic resins such as alkylphenol resins and rosin-modified phenolic resins, and xylene resins. These may be used alone or in suitable combination of two or more thereof. Terpene resins also are usable.

Besides the ingredients shown above, various additives which have been added to pressure-sensitive adhesives can be incorporated into the pressure-sensitive adhesive. For example, a thickener may be incorporated. Examples thereof include carboxyvinyl polymers, carboxymethyl cellulose, gelatin, dextrin, hydroxypropylmethyl cellulose, hydroxypropyl cellulose, and alginic acid (salts). These may be used alone or in suitable combination of two or more thereof.

A softener can be incorporated. Examples thereof include styrene resins and petroleum-derived softeners. These may be used alone or in suitable combination of two or more thereof.

A filler can be incorporated. Examples thereof include magnesium carbonate, calcium carbonate, aluminum sulfate, calcium sulfate, barium sulfate, calcium sulfite, molybdenum disulfide, aluminum silicate, calcium silicate, diatomaceous earth, silica rock powder, talc, silica, and zeolite. These may be used alone or in suitable combination of two or more thereof.

A pigment can be incorporated. Examples thereof include inorganic pigments such as alumina white, graphite, titanium oxide, zinc white, block iron oxide, micaceous iron oxide, white lead, white carbon, molybdenum white, carbon black, litharge, lithopone, barite, cadmium red, cadmium-mercury red, red iron oxide, molybdenum red, red lead, yellow lead, cadmium yellow, barium yellow, strontium yellow, titanium yellow, titanium blacks chromium oxide green, cobalt oxide, cobalt green, cobalt-chromium green, ultramarine, prussian blue, cobalt blue, cerulean blue, manganese violet, and cobalt violet and organic pigments such as shellac, insoluble azo pigments, soluble azo pigments, condensation azo pigments, phthalocyanine blue, and color lakes. These may be used alone or in suitable combination of two or more thereof.

An ultraviolet absorber can be incorporated. Examples thereof include salicyclic acid derivatives such as phenyl salicylate, p-octylphenyl salicylate, and p-t-butylphenyl salicylate, benzophenone compounds such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-S-sulfobenzophenone trihydrate, 2-hydroxy-4-n-octoxybenzophenone, 2-hydroxy-4-octadecyloxybenzophenone, 2,2',4,4'-tetrahydroxybenzophenone, 4-dodecyloxy-2-hydroxybenzophenone, 2-hydroxy-4-(2-hydroxy-3-methacryloxy)propoxybenzophenone, and bis(2-methoxy-4-hydroxy-5-benzoylphenyl)methane, benzotriazole compounds such as 2-(2'-hydroxy-5'-methylphenyl)benzotriazole, 2-(2-hydroxy-3',5'-di-tert-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-4'-n-octoxyphenyl)benzotriazole, 2-(2'-hydroxy-5'-n-t-butylphenyl)benzotriazole, 2-(2'-hydroxy-3',5'-di-t-amylphenyl)benzotriazole, 2-[2'-hydroxy-3'-(3",5",5",6"-tetrahydrophthalimidomethyl)-5'-methylphenyl]benzotriazole, and 2,2-methylenebis[4-(1,1,3,3-tetramethylbutyl)-6-(2H-benzotriazol-2-yl)phenol], and cyanoacrylate compounds such as 2-ethylhexyl 2-cyano-3,3'-diphenylacrylate and ethyl 2-cyano-3,3'-diphenylacrylate. These may be used alone or in suitable combination of two or more thereof.

Furthermore, various additives for pressure-sensitive adhesives, such as an antibacterial, lubricant, anti-blocking agent, and antistatic agent, can be incorporated according to need. These may be used alone or in suitable combination.

For preparing the pressure-sensitive adhesive, the ingredients described above may be mixed according to a given formulation in the same manner as for pressure-sensitive adhesives heretofore in use. For example, a roll mill, Banbury mixer, Brabender, kneader, or the like may be used for the mixing. The major ingredients, plasticizer, and additives may be in any of an emulsion form, solvent form, and the like.

In applying the pressure-sensitive adhesive to the substrate, it is dissolved in an appropriate solvent and this coating fluid is applied. Examples of the solvent include esters such as methyl formate, ethyl acetate, and butyl acetate, alcohols such as isopropanol, hydrocarbons such as hexane, cyclohexane, toluene, and xylene, and ketones such as acetone, methyl ethyl ketone, and cyclohexanone. The amount of the solvent to be used is 5-900% by weight, preferably 10-400% by weight, based on the total weight of the pressure-sensitive adhesive from the standpoint of applicability. The viscosity of the coating fluid is 1,000-50,000 mPa·s (25° C.), preferably 2,000-30,000 mPa·s (25° C.), from the standpoint of applicability.

The amount of the pressure-sensitive adhesive to be applied may be the same as in general pressure-sensitive adhesive tapes. An appropriate range thereof is 10-150 µm in terms of thickness on a dry basis. Incidentally, priming the substrate can enhance adhesion between the substrate and the pressure-sensitive adhesive.

EXAMPLE

The invention will be further explained below by reference to a Test Example, but the invention should not be construed as being limited by the Example in any way.

Pressure-sensitive adhesives prepared according to the formulations shown in Table 1 were used to produce pressure-sensitive adhesive tapes A to G. Pressure-sensitive adhesive tapes A to D and F were produced by applying the pressure-sensitive adhesives shown in the table to a halogen-free tape substrate made of an ethylene/propylene copolymer containing magnesium hydroxide as a flame retardant. Pressure-sensitive adhesive tape E was produced by applying the pressure-sensitive adhesive shown in the table to a commercial substrate for PVC pressure-sensitive adhesive tapes. Pressure-sensitive adhesive tape F was produced by applying a commercial pressure-sensitive adhesive (its composition is as shown in the table) for PVC pressure-sensitive adhesive tapes to the same halogen-free tape substrate. The modified acrylic resins used were ones obtained by copolymerizing 2-ethylhexyl acrylate with terpene-phenol in the proportions shown in the table. The pressure-sensitive adhesive tapes were subjected to the following evaluations. The results thereof are shown in Table 1.

(1) Adhesion

Adhesion was evaluated in accordance with JIS C2107. The cases which were superior, equal, slightly inferior, and inferior in adhesion to a commercial PVC pressure-sensitive adhesive tape are indicated by "A", "B", "C", and "D", respectively. The case where the pressure-sensitive adhesive had no tackiness and was considerably inferior in adhesion is indicated by "E".

(2) Suitability for Winding Operation (Unsusceptibility to Getting Loose)

An electric-wire winding operation was conducted at room temperature. The case where the pressure-sensitive adhesive tape did not get loose is indicated by "A" and the case where the pressure-sensitive adhesive tape got loose is indicated by "B".

(3) Blushing

At room temperature, an electric-wire winding operation was conducted and the pressure-sensitive adhesive tape was stripped off. The case where the tape stripped had suffered substrate surface blushing is indicated by "B" and the case where the tape stripped had suffered no blushing is indicated by "A".

(4) End Peeling

A pressure-sensitive adhesive tape was wound around electric wires so as to make a half lap and allowed to stand in this state for 24 hours at room temperature. The case where the pressure-sensitive adhesive tape suffered no end peeling is indicated by "A" and the case where the pressure-sensitive adhesive tape suffered end peeling is indicated by "B".

(5) Evaluation of Wire Harness Appearance

Six electric wires were bound by winding a pressure-sensitive adhesive tape therearound so as to make 5 laps, and the bound electric wires were evaluated for appearance. The case where the pressure-sensitive adhesive tape was free from wrinkling, end peeling, and blushing like the commercial PVC pressure-sensitive adhesive tape is indicated by "A", and the case where the pressure-sensitive adhesive tape developed a larger number of wrinkles as compared with the commercial PVC pressure-sensitive adhesive tape and suffered end peeling and blushing is indicated by "B".

TABLE 1

|  | Pressure-sensitive adhesive tape A | Pressure-sensitive adhesive tape B | Pressure-sensitive adhesive tape C | Pressure-sensitive adhesive tape D | Pressure-sensitive adhesive tape E | Pressure-sensitive adhesive tape F | Pressure-sensitive adhesive tape G |
|---|---|---|---|---|---|---|---|
| Natural rubber | 10 | 10 | 10 | 10 | 10 | 10 | 30 |
| Tackifier resin | 18 | 18 | 18 | 18 | 18 | 18 | 28 |
| Plasticizer | 10 | 10 | 10 | 10 | 10 | 10 | |
| Antioxidant A | 2 | 2 | 2 | 2 | 2 | 2 | |
| Antioxidant B | | | | | | | 2 |
| Modified acrylic resin | 60 | 60 | 60 | 60 | 60 | 60 | |
| Terpene-phenol amount | <2 | 2-3 | 4-8 | 9-11 | >11 | 4-8 | |
| Acrylic resin | | | | | | | 40 |
| Adhesion | D | C | B | A | A | D | E |
| Unsusceptibility to getting loose | B | B | A | A | A | B | B |
| Blushing | A | A | A | B | B | A | A |
| End peeling | B | B | A | A | A | B | B |
| Appearance evaluation | B | B | A | B | B | B | B |

Note 1)
Ingredient amount is % by mass.
Note 2)
Terpene-phenol amount (unit: parts by weight) is based on 100 parts by weight of 2-ethylhexyl acrylate.
Note)
Tackifier resin: "KE-726" manufactured by Arakawa Chemical Ltd.
Plasticizer: "KE-799" manufactured by Arakawa Chemical Ltd.
Antioxidant A: "KE-800" manufactured by Arakawa Chemical Ltd.
Antioxidant B: "KM2106" manufactured by ABI Corporation.
Acrylic resin: "TS-805" manufactured by Nippon Carbide Co., Ltd.

Table 1 shows the following. Pressure-sensitive adhesive tape C, which was obtained according to the invention by applying a pressure-sensitive adhesive containing a modified acrylic resin obtained by copolymerization with 4-8 parts by weight of terpene-phenol to a halogen-free tape substrate, is satisfactory in all evaluation. In contrast, pressure-sensitive adhesive tapes A and B, in which the terpene-phenol amount was small, have low adhesion, are apt to get loose, and are inferior in wire harness finish. Pressure-sensitive adhesive tapes D and E, in which the terpene-phenol amount was excessively large, have too high adhesion and hence suffer blushing. These two adhesive tapes are inferior also in wire harness finish. Pressure-sensitive adhesive tape F, which employs a substrate for PVC pressure-sensitive adhesive tapes although the pressure-sensitive adhesive specified in the invention is used therein, does not have sufficient adhesion, is apt to get loose, and is inferior also in wire harness finish. Furthermore, pressure-sensitive adhesive tape G, which employs a combination of a pressure-sensitive adhesive for PVC pressure-sensitive adhesive tapes and a halogen-free tape substrate, has considerably low adhesion, is apt to get loose, and is inferior also in wire harness finish.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 10, 2004 (Application No. 2004-358774), the entire contents thereof being herein incorporated by reference.

INDUSTRIAL APPLICABILITY

According to the invention, the adhesion of a halogen-free pressure-sensitive adhesive tape, in particular, the adhesion of the pressure-sensitive adhesive to the substrate, can be heightened to thereby improve suitability for binding.

The invention claimed is:

1. A halogen-free pressure-sensitive adhesive tape which comprises a tape substrate made of a non-halogen resin composition containing no halogen elements and, applied to at least one side of the substrate, a pressure-sensitive adhesive containing a modified acrylic resin obtained by copolymerizing acrylic acid or an acrylic ester with a monomer which forms a terpene resin, and wherein in the modified acrylic resin, the amount of the monomer which forms the terpene resin is 4-8 parts by weight per 100 parts by weight of the acrylic acid or acrylic ester.

2. The halogen-free pressure-sensitive adhesive tape according to claim 1, wherein the pressure-sensitive adhesive contains at least one of acrylic resins and tackifier resins.

3. The halogen-free pressure-sensitive adhesive tape according to claim 1, wherein the terpene resin is terpene-phenol.

* * * * *